United States Patent [19]
Rhodes

[11] 4,291,450
[45] Sep. 29, 1981

[54] METHOD AND APPARATUS FOR MANUFACTURING FINNED HEAT EXCHANGERS

[75] Inventor: Eugene E. Rhodes, Belleville, Mich.

[73] Assignee: Ford Motor Company, Dearborn, Mich.

[21] Appl. No.: 82,248

[22] Filed: Oct. 5, 1979

[51] Int. Cl.³ .......................................... B23P 15/26
[52] U.S. Cl. .............................. 29/157.3 R; 228/183;
    228/173 D; 228/4.1; 29/157.3 A; 29/726
[58] Field of Search ...................... 29/726, 727, 157.4,
    29/157.3 D, 157.3 R, 157.3 A; 228/173 D, 183, 4.1

[56] References Cited
U.S. PATENT DOCUMENTS

| | | | |
|---|---|---|---|
| 2,684,425 | 7/1954 | Vickland | 219/4 |
| 3,412,448 | 11/1968 | Landberg | 29/157.3 D |
| 3,745,631 | 7/1973 | Jonason et al. | 29/726 |
| 3,762,031 | 10/1973 | Jonason et al. | 29/157.3 D |
| 3,960,308 | 6/1976 | Jonason | 29/727 |

FOREIGN PATENT DOCUMENTS

732426  6/1955  United Kingdom ........ 29/157.3 D

*Primary Examiner*—Nicholas P. Godici
*Assistant Examiner*—V. K. Rising
*Attorney, Agent, or Firm*—William E. Johnson; Olin B. Johnson

[57] ABSTRACT

A method and apparatus for producing highly effective head exchanger elements of the type which comprise corrugated surface enlarging members of strip material fixed to thin walled substrates. The strip material which can be either pre-corrugated or corrugated synchronously with the heat exchanger element manufacturing process is advanced concurrently with a substrate material to a station at which the strip is lightly held in firm abutment with the substrate material by means of an impinging stream of gaseous medium and simultaneously metallurgically bonded to the substrate. The composite product is then cut into lengths to form finished heat exchanger elements.

2 Claims, 1 Drawing Figure

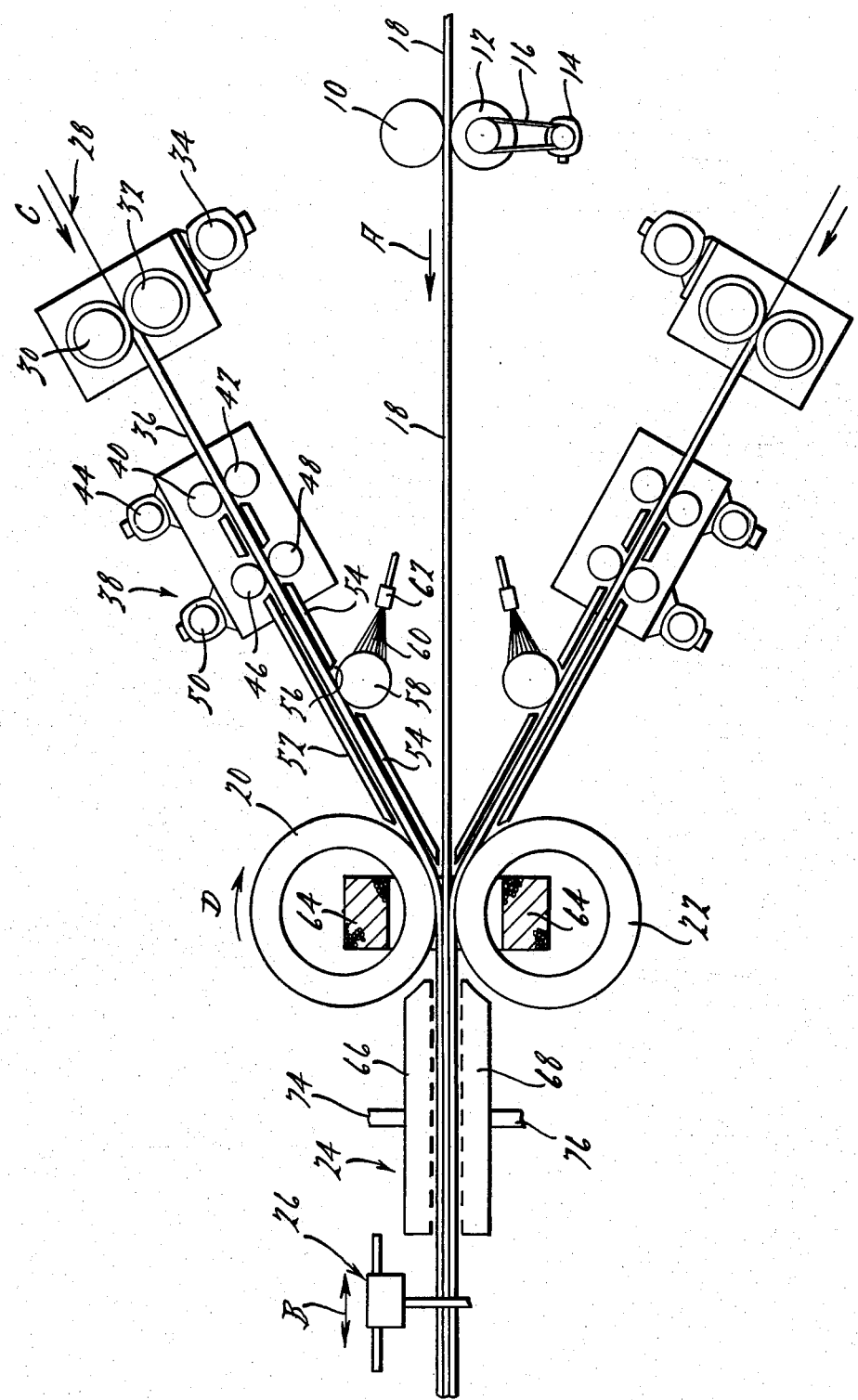

METHOD AND APPARATUS FOR MANUFACTURING FINNED HEAT EXCHANGERS

BACKGROUND OF THE INVENTION AND PRIOR ART STATEMENT

A U.S. Pat. No. 3,745,631 issued on July 17, 1973 for a "Method and Apparatus for Manufacturing Finned Heat Exchangers." The subject matter of this application constitutes an improvement on the method and apparatus disclosed in this patent.

U.S. Pat. No. 3,745,631 teaches a method and apparatus for producing heat exchanger elements of the type which comprise corrugated surface enlarging members of strip material fixed to a thin wall substrate, sometimes called a basic profile. The strip material, which can be either pre-corrugated or corrugated just prior to its use, is advanced concurrently with the basic profile to a station at which the strip is lightly held in firm abutment with the basic profile by means of an impinging stream of a gaseous medium, and is simultaneously metallurgically bonded to the substrate. The composite product is then cut into lengths to form finished heat exchanger elements.

In accordance with the teachings of U.S. Pat. No.3,745,631 a preheat furnace or melt zone 15 is provided to heat the basic profile prior to the time at which the basic profile is metallurgically bonded to the corrugated strip material. While not so stated in the patent, the company selling these machines has made the preheating furnace construction one in which an inert gas such as nitrogen is used as a protective atmosphere during heating.

In order to maintain the inert atmosphere within the preheat furnace 15, an elaborate system is necessary for introducing the basic profile and then removing the same from the preheat furnace so that the inert gases are not permitted to escape therefrom. Such an elaborate system is very costly and, of course, adds to the cost of the overall process and apparatus.

It is a principal object of this invention to provide a process and apparatus for heating the various elements which are to be metallurgically bonded in a manner which is more efficient and less costly than that devised and shown in the 3,745,631 patent.

A U.S. Pat. No. 2,684,425 issued on July 20, 1954 for an "Induction Brazing Jig." This patent shows a brazing jig assembly for assembling heat exchanger envelopes in which metallurgical bonds are formed between various components in order to form a completed heat exchange envelope. The patent shows the use of an electric induction heating coil 52 positioned adjacent the members to be bonded. This heating coil is positioned so as to completely embrace the envelope assembly as it is drawn through the coil. The coil is used to heat the materials passing therethrough in order to obtain the required metallurgical bond by a brazing action between the various components.

SUMMARY OF THE INVENTION

The invention relates to an improved method and apparatus for manufacturing finned heat exchangers. The improved method and apparatus for manufacturing such heat exchangers is set forth briefly below.

The improved method comes about in a method for series manufacture of heat exchange elements. Basically, these exchange elements are of the type which comprise a metallic, relatively thin walled basic profile provided with a longitudinally extending surface engaging member which is in the form of a metallic strip corrugated transversely of the longitudinal axis thereof which is in intimate heat conducting contact with the basic profile. In the method of manufacturing these heat exchange elements, the following steps are carried out either prior to the actual manufacture of the heat exchange elements, or in conjunction with the manufacture thereof. Desired lengths of the basic profile are formed. These lengths of the basic profile are advanced in series from one end thereof. The metallic strip corrugated transversely of its longitudinal axis is also advanced concurrently with the basic profile. The corrugated strip is successively guided into abutment with the basic profile. A stream of a gaseous medium is impinged against the corrugated strip in order to exert a holding force so that the crests of the corrugations of the corrugated strip are held in firm abutment with the basic profile. A permanent metallic bond is established between the basic profile and the crests of the corrugations of the corrugated strip. As a final step, the basic profile with the corrugated strip permanently fixed along the length thereof is cut into desired lengths.

In accordance with the improved method of this invention, the heat necessary for establishing a permanent metallic bond between the basic profile and the crests of the corrugations is supplied at the location where the corrugated strip is guided into abutment with the basic profile. The supplied heat is developed by means of an induction heating coil.

In accordance with the teachings of the improved apparatus, an apparatus is provided for the series manufacture of heat exchange elements. The heat exchange elements are of the type which comprise a metallic, relatively thin walled basic profile provided with a longitudinally extending surface engaging member which is in the form of a metallic strip corrugated transversely of the longitudinal axis thereof which is in intimate heat conducting contact with the basic profile. The apparatus to make these heat exchange elements includes a first feed device for feeding desired lengths of the basic profile in a series from one end thereof in an individual path of movement. A second feed device feeds the corrugated metallic strip concurrently with the basic profile into abutment with the basic profile and entrained in the movement thereof. A blower device is positioned in the path of movement behind the corrugated strip. The blower device is arranged so as to impinge a stream of a gaseous medium against the corrugated metallic strip passing therepast. This action maintains the corrugated metallic strip in abutment with and correctly distributed along the surface of the basic profile.

In accordance with the teachings of this invention, the improved apparatus includes an induction heater device associated with the second feed device. The induction heater device is positioned at a location where the corrugated metallic strip has been fed into abutment with the basic profile. The induction heater device successively establishes metallic bonds between the basic profile and the crests of corrugations of the corrugated metallic strip during passage of that corrugated metallic strip and the basic profile past the blower device.

BRIEF DESCRIPTION OF THE DRAWING

The novel features that are considered characteristic of the invention are set forth with particularity in the appended claims. The invention itself, however, both as to its organization and method of operation, together with additional objects and advantages thereof, will best be understood from the following description of a specific embodiment when read in conjunction with the accompanying drawing. The drawing illustrates diagramatically and in plan view an exemplary embodiment of the plan for carrying out the method of this invention.

DESCRIPTION OF THE PREFERRED EMBODIMENT

In the exemplary embodiment there are included two feed rollers 10 and 12 of which one is driven by a motor 14 over appropriate transmission device, for example, a belt 16. The rollers 10 and 12 are arranged to feed an elongated metallic basic profile 18 preferably at a determined speed in the direction of arrow A. The basic profile may be manufactured by known processes such as, for example, by extrusion or by shaping strip material into a basic profile shape.

It is assumed in the following description that the basic profile 18 fed in the direction indicated by arrow A in the drawing has previously been provided with a coating of an appropriate solder. It is preferred that the material from which the profile is made comprises copper or copper alloy which is advantageous from the aspect of heat and soldering. The selection of the metal used to make the basic profile 18 is not restricted to the metals mentioned above, but can be broadened to include other metals suitable for use in the environment intended.

The basic profile 18 is moved in a rectalinear path in the direction of arrow A between two feed rollers 20 and 22. The basic profile 18 passes from the rollers 20 and 22 through a combined cooling and holddown device generally identified by the numeral 24. Thereafter, the basic profile 18 passes through a flying cutter device generally identified by the numeral 26. This flying cutter device 26 operates according to the principal of flying shears, that is, a shear which is able to move in the directions indicated by the double arrow B. The cutting structure and associated guide structure forming the flying cutter device 26 can be adjusted with respect to the length of stroke, as is well known in the art. Moreover, the speed of movement of the cutting device can be adjusted to coincide with the speed at which the basic profile 18 is advanced during the cutting period.

It is intended in the illustrated preferred embodiment that the basic profile 18 shall be provided on two sides thereof with a surface enlarging device in the form of a corrugated metal strip. The metal strip is suitably formed from a metal of very high thermal conductivity. When applying the method of the present invention, the thin metal strip generally has a thickness of between 110 um, suitably between 35 and 15 um, and preferably 25 um. Corrugated metal foil strip of such extreme thickness is, however, liable to become deformed and should therefore be processed mechanically to prevent the occurrence of deformations during the treatment process and during the period of conveyance to a position where they merge with the basic profile 18 located between the feed rollers 20 and 22.

As will be seen from the drawing, duplicate devices are arranged on either side of the advancing basic profile 18 for handling and conveying the corrugated strip material to the position between the two feed rollers 20 and 22. The two handling and conveying devices are located one below and one above the basic profile 18. Since these devices are completely identical to each other, although in mirror image, only the upper device will be described in detail, while it is at the same time assumed that the function of the two devices coincide in all parts thereof.

A metal strip generally identified by the numeral 28 is fed in a manner shown in the drawing into a folding device which is formed of two meshing cogs 30 and 32 driven by a suitable motor 34. The metal strip 28 may have any suitable thickness and, in this preferred embodiment, is presumed to have a foil thickness. The strip may be formed of copper or copper alloy and it generally moves in the direction of arrow C of the drawing.

The metal strip 28 is corrugated during its passage between the meshing cogs 30 and 32 and leaves the cogs in the form of a coiled strip 36 folded transversely of its longitudinal axis. The coil strip 36 is then guided into a compacting device indicated generally by the numeral 38. This compacting device includes two groups of feed rollers, that is, rollers 40 and 42, driven by a motor 44, and rollers 46 and 48, driven by a motor 50. The drive motors are arranged to drive their respective pairs of rolls in a manner whereby the roll pair 46, 48 has a lower peripheral speed than the roll pair 40, 42. Consequently, during the passage of the metal strip 28 between the two pairs of rolls, the corrugated foil strip will be subjected to a continuous compression force in the direction of movement owing to the disparity in peripheral speed between the two pairs of rolls.

The longitudinally compressed, corrugated metal strip 28 is passed from the compacting device 38 between a pair of guide structures 52 and 54 towards the nip between feed rollers 20 and 22. The guide structure 54 presents a cut away portion 56 in which projects an applicating roller 58 for a fluxing agent which is applied to the wave crests of the passing corrugated metal strip 28. A fluxing agent 60 is sprayed onto the applicating roll 58 from a suitable nozzle 62, as shown in the drawing, the applicating roll 58 transfering the flux to the strip 28.

The corrugated fluxed strip 28 leaves the guide structures 52 and 54 and is then entrained by the feed roller 20, which constantly rotates in the direction of arrow D. This carries the corrugated fluxed strip 28 into abutment with the basic profile 18 passing between the feed rollers 20 and 22, the fluxed waved crests coming into contact with the solder on the basic profile 18.

The manner in which the solder on the basic profile 18 is liquified in order to form a metallurgical bond between the basic profile and the crests of the corrugated metal strip 28 will be described hereinafter. This method of obtaining the heating to melt the solder constitutes the improvement of this invention.

An induction heating coil 64 is provided at the area of the nip of feed rollers 20 and 22 for the purpose of supplying heat at this location to the basic profile 18 so that the solder carried thereon can be melted. When the solder is melted, the crests of the corrugated metal strip 28, which have the proper flux thereon, will be metallurgically bonded to the basic profile 18. Thus, this invention teaches the application of an induction heating of the basic profile at the area where the basic profile 18 and the corrugated metal strip are brought into contact with one another. There is no requirement that a nitrogen gas atmosphere be present when the heating is carried out by means of an induction heating device. The advantages of heating the solder on the basic profile 18 at this location, rather than doing it ahead of time, are that one can get a more intense and more uniform heating of the material to be bonded. This permits the use of a higher melting temperature solder which has a reduced tin content.

The basic profile 18 and the corrugated metal strip 28 brought into contact therewith at the area of the nip of feed rolls 20 and 22 are then fed into a hold-down device generally indicated by the numeral 24. This cooling and hold-down device generally includes two guide structures 66 and 68 in the form of hollow boxes, the guide surfaces of which are provided respectively with perforations 70 and 72. A gaseous medium, such as air, is introduced into the boxes through nozzles 74 and 76, respectively, and caused to impinge upon the corrugated strip. The gaseous medium cools the solder to the point of solidification and at the same time exerts a holding force on each of the two corrugated strips, thereby maintaining the strips in firm abutment with their associated sides of the basic profile 18. When the solder has solidified, the basic profile will be provided with a permanently fixed, continuous surface enlargement in the form of at least one corrugated metal strip which is in metallic contact with the basic profile.

The basic profile provided with the surface enlargement is then cut into suitable predetermined lengths by means of the flying cutter device 26. As previously described, this flying cutter device, together with its driving assembly, is capable of moving in the direction of double arrow B at a selective length of stroke and speed.

While a particular embodiment of both the method and the apparatus of this invention have been illustrated and described, it will be obvious to those skilled in the art that various changes and modifications may be made without departing from the invention, and it is intended in the appended claims all such modifications and equivalents as fall within the true spirit and scope of this invention.

What is claimed is:

1. In a method for series manufacture of:
heat exchange elements of the type which comprise a metallic, relatively thin walled basic profile provided with a longitudinally extending surface engaging member which is in the form of a metallic strip corrugated transversely of the longitudinal axis thereof which is in intimate heat conducting contact with said basic profile wherein the following steps are carried out prior to the actual manufacture of the heat exchange elements or in conjunction with the manufacture thereof: (a) forming desired lengths of said basic profile, (b) advancing said lengths of basic profile in a series from one end thereof, (c) advancing concurrently therewith said metallic strip corrugated transversely of its longitudinal axis, (d) guiding said corrugated strip successively into abutment with said basic profile, (e) impinging a stream of a gaseous medium against said corrugated strip in order to exert a holding force so that the crests of the corrugations of said corrugated strip are held in firm abutment with said basic profile, (f) establishing a permanent metallic bond between said basic profile and said crests of said corrugations of said corrugated strip, and (g) cutting said basic profile with said corrugated strip permanently fixed along the length thereof into desired lengths;

the improvement comprising:
supplying the heat necessary for establishing a permanent metallic bond between said basic profile and said crests of said corrugations at the position where said corrugated strip is guided into abutment with said basic profile, and developing said supplied heat by means of an induction heating coil positioned at a position where said corrugated metallic strip has been fed into abutment with said basic profile.

2. In an apparatus for series manufacture of:
heat exchange elements of the type which comprise a metallic, relatively thin walled basic profile provided with a longitudinally extending surface engaging member which is in the form of a metallic strip corrugated transversely of the longitudinal axis thereof which is in intimate heat conducting contact with said basic profile, said apparatus comprising: (a) first feed means for feeding desired lengths of said basic profile in a series from one end thereof in an individual path of movement, (b) second feed means for feeding said corrugated metallic strip concurrently with said basic profile into abutment with said basic profile and entrained in the movement thereof, and (c) blower means positioned in the path of movement behind said corrugated strip and arranged to impinge a stream of a gaseous medium against said corrugated metallic strip passing therepast so as to maintain said corrugated metallic strip in abutment with and correctly distributed along the surface of said basic profile;

the improvement comprising:
induction heater means associated with said second feed means at a location where said corrugated metallic strip has been fed into abutment with said basic profile, said induction heater means for successively establishing metallic bonds between said basic profile and crests of corrugations of said corrugated metallic strip during passage of said corrugated metallic strip and said basic profile past said blower means.

* * * * *